(12) United States Patent
Brundermann

(10) Patent No.: US 6,843,273 B2
(45) Date of Patent: Jan. 18, 2005

(54) GILLED PIPE

(76) Inventor: Georg Brundermann, Hauptstrasse 32, 49832 Thuine (DE)

( * ) Notice: Subject to any disclaimer, the term of this patent is extended or adjusted under 35 U.S.C. 154(b) by 0 days.

(21) Appl. No.: 10/258,112

(22) PCT Filed: Jan. 19, 2001

(86) PCT No.: PCT/DE01/00212

§ 371 (c)(1),
(2), (4) Date: Oct. 18, 2002

(87) PCT Pub. No.: WO01/81022

PCT Pub. Date: Nov. 1, 2001

(65) Prior Publication Data

US 2003/0106599 A1 Jun. 12, 2003

(30) Foreign Application Priority Data

Apr. 22, 2000 (DE) .......................... 100 20 011

(51) Int. Cl.[7] ................................ F15D 1/02
(52) U.S. Cl. .................. 138/38; 138/144; 165/180; 165/184
(58) Field of Search .................. 138/38, 144; 165/184, 165/180

(56) References Cited

U.S. PATENT DOCUMENTS

| | | | |
|---|---|---|---|
| 2,070,539 A | | 2/1937 | Muhleisen |
| 2,372,795 A | * | 4/1945 | Rodeck ................. 29/890.048 |
| 2,416,865 A | | 3/1947 | Bronander |
| 2,472,245 A | * | 6/1949 | Busse .................... 29/890.048 |
| 2,965,744 A | | 12/1960 | Busse |
| 3,053,971 A | | 9/1962 | Busse |
| 3,077,928 A | * | 2/1963 | Nihlen et at. ................. 165/180 |
| 3,362,058 A | * | 1/1968 | Morris et al. ........... 29/890.048 |
| 3,397,440 A | | 8/1968 | Dalin |
| 3,434,533 A | | 3/1969 | Pignal |
| 3,500,903 A | * | 3/1970 | McElroy ...................... 165/184 |
| 3,550,235 A | * | 12/1970 | Boose et al. ........... 29/890.048 |
| 3,578,165 A | * | 5/1971 | Boose ........................ 219/107 |
| 3,723,693 A | | 3/1973 | Boose et al. |
| 4,224,984 A | | 9/1980 | Miyata et al. |
| 4,545,428 A | * | 10/1985 | Onishi et al. ................ 165/110 |
| 4,558,735 A | * | 12/1985 | Meike ......................... 165/131 |
| 5,031,694 A | * | 7/1991 | Lloyd ......................... 165/184 |
| 5,085,272 A | * | 2/1992 | Venables, IV ............... 165/184 |
| 5,781,987 A | * | 7/1998 | Castren ....................... 29/727 |

FOREIGN PATENT DOCUMENTS

| | | |
|---|---|---|
| DE | 1 106 008 B | 5/1961 |
| DE | 1501 503 A | 12/1969 |
| EP | 604 439 B1 | 7/1994 |
| GB | 226 175 A | 7/1925 |

* cited by examiner

Primary Examiner—James Hook
(74) Attorney, Agent, or Firm—Brooks Kushman, P.C.

(57) ABSTRACT

The invention relates to a method for producing gilled metal pipes. According to the method, at least one continuous, gill-forming strip is applied to a rotating pipe body at a tangent and unwound onto the pipe body in an approximately helical line. The side of the strip facing towards the pipe body is connected to the pipe surface by a welding device, using an additional material. The welding process is optimized and the finishing quality increased by molding a web that is bent at right angles to the strip that forms the gills before the strip is wound onto the pipe body. The strip is preferably bent into a U-shape and the web, which runs between the two limbs of the U-shape, is guided flatly onto the pipe body.

9 Claims, 5 Drawing Sheets

Figure 1:
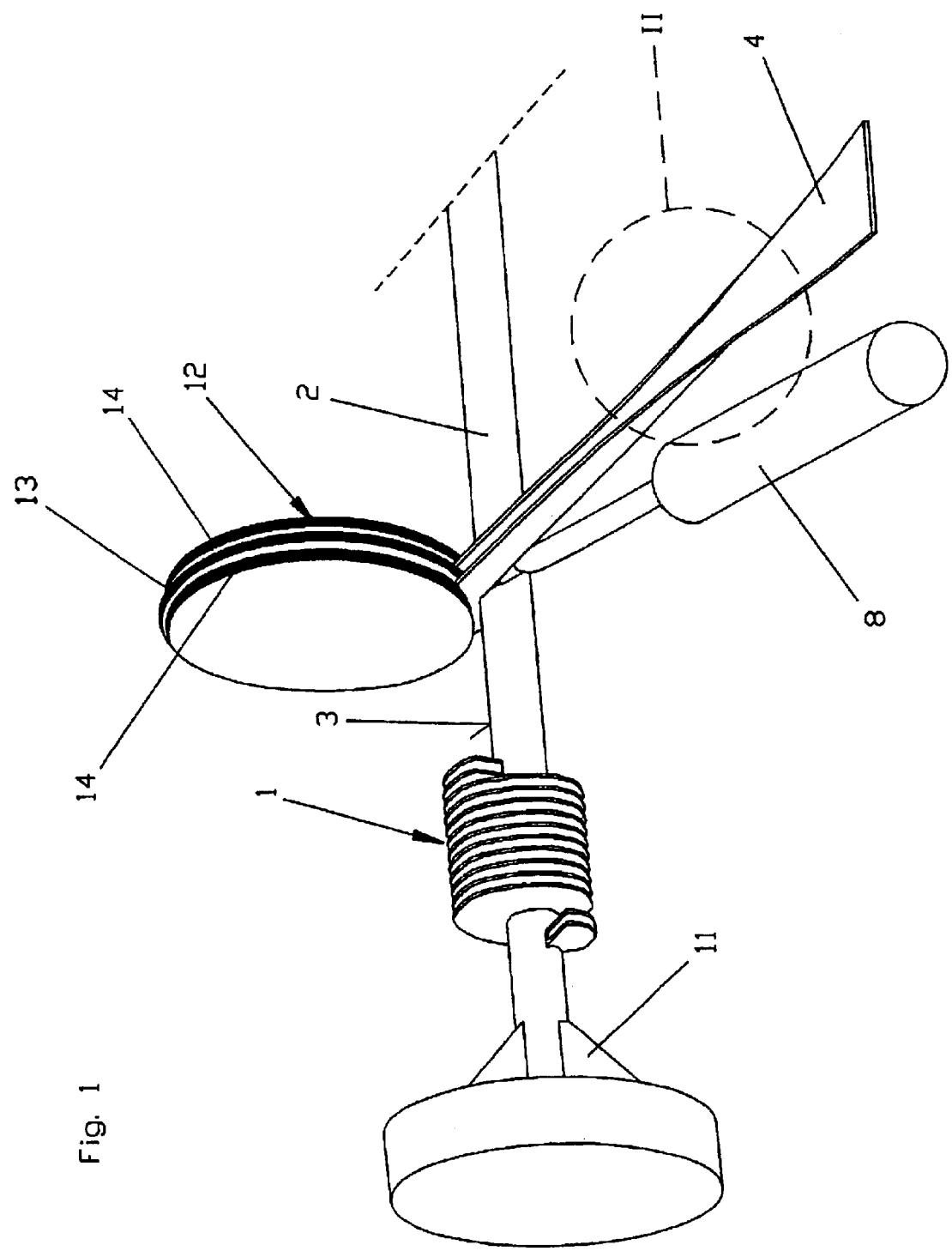

Fig. 6
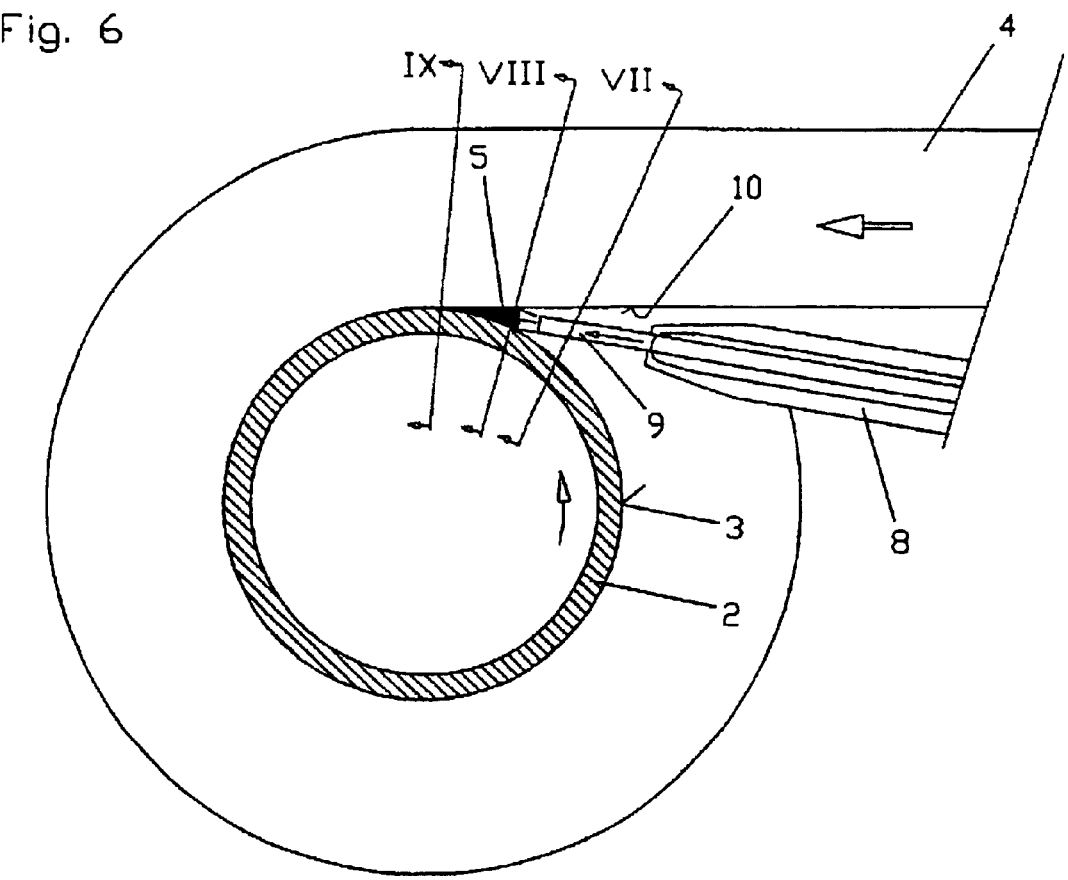
Fig. 8
Fig. 9
Fig. 7
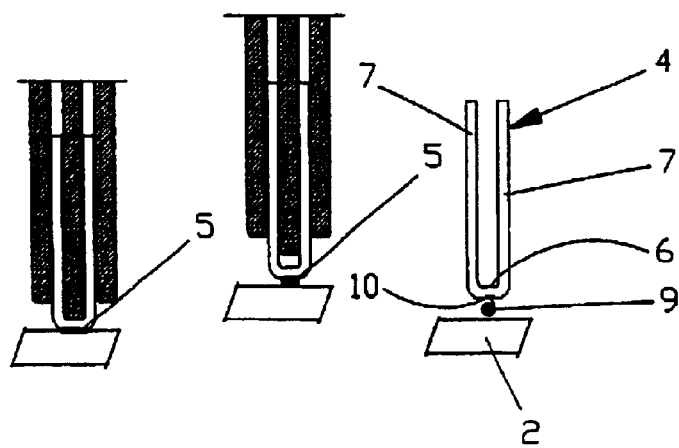

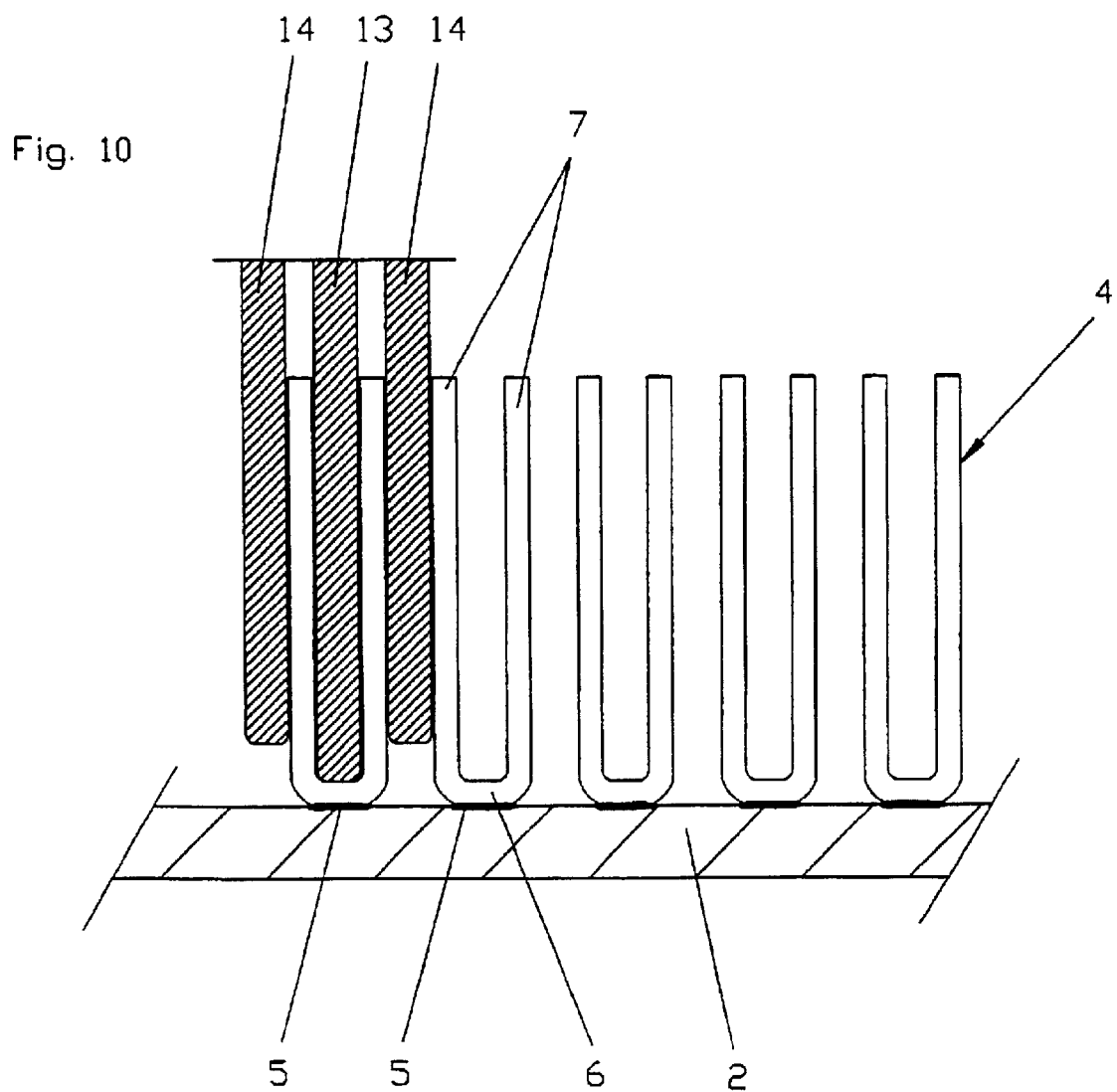

GILLED PIPE

The invention relates to a method for producing gilled metal pipes, particularly heat exchanger pipes, where at least one continuous, gill-forming strip is applied to a rotating pipe body at a tangent and wound onto the pipe body in an approximately helical line, the side of the strip facing the pipe body is connected to the pipe surface by means of a welding device using an additional material, and the working end of the welding device is guided in the open wedge between the pipe surface and the winding strip. The invention further relates to an device for implementing the method, and to a gilled pipe manufactured by this method.

A method of the type described is known from EP 0 604 439 B1. In this known method, the strip is fed vertically to the rotating pipe body and the narrow side of the strip facing the pipe body is welded to the surface of the pipe body. In this context, the welding device is guided at the same angle relative to the pipe axis as the feed strip that forms the gills. In this case, the welding bead is as wide as the strip is thick.

Very good results can already be achieved with the known method and it enables extremely fast and efficient processing.

The object of the invention is to further optimise the known method and, in particular, to increase the production output and to enhance the quality of the gilled pipe to be produced.

According to the invention, the object is solved in that a web is bent roughly at right angles on the strip that forms the gills before said strip is wound onto the pipe body, in that the web is guided flat on the pipe body during winding of the strip onto the pipe body, while the leg positioned roughly at a right angle thereto forms the gills, and in that welding is carried out in the region of the open wedge between the pipe body surface and the contact surface of the web facing the pipe body surface.

Due to the enlarged surface area between the gill and the pipe, a thicker wire can be used for welding, thus enabling the use of a higher welding current. As a result of the higher welding current, the welding speed can be increased, meaning that the production output can be substantially improved. Increases in output of up to 50% are possible.

In a particularly preferred embodiment of the method according to the invention, the strip forming the gills is bent into a U-shape prior to winding onto the pipe body, where the flat web formed between the two legs of the U is guided flat on the pipe body and the two U-legs are positioned roughly at a right angle thereto form the gills.

By applying this method, two gills can be welded simultaneously during one rotation of the hollow body, this again doubling the production output.

Another improvement in welding output and weld quality, can be achieved in that the contact surface of the web is profiled prior to welding. Profiling of this kind can be in the form of longitudinal ribs, transverse ribs or nubs, for example. Profiling of this kind can strengthen the welded joint, because it is very important at high working speeds to obtain a weld that is perfectly formed, particularly in the transitional area between the parts to be joined.

In another preferred embodiment of the method, the web is provided with a bulge facing away from its contact surface prior to welding. This bulge can be used to guide the weld and thus largely prevent the weld from "spilling" over the edge.

In any case, the weld can be narrower than the width of the web, meaning that the weld does not protrude laterally beyond the web. Due to the good welding result that can be achieved using the method according to the invention, a relatively narrow weld is sufficient, this not only increasing the working speed, but also enabling additional material to be saved.

When applying the method according to the invention, both the surface of the pipe body and the contact surface of the web to be welded to it can be fused during the welding process. This helps achieve strong welding of the two parts to be joined.

Alternatively, however, it is also possible—as in the known method described—with the help of the welding device and using the additional material, to apply a welding bead to the pipe surface precisely in the connecting area between the web and the pipe surface, before the web to be welded contacts it, where the web is then pressed into the still-molten welding bead.

In all applications of the method according to the invention, the welding device should be guided at the same angle to the axis of the pipe body as the feed strip that forms the gills.

To further improve the weld quality, the web can be firmly pressed at least briefly against the pipe body immediately after welding. In the known method, where the gill-forming strip does not have a web, it is impossible, or very difficult, to press it on.

The device according to the invention for implementing the method comprises a chucking device for the pipe body to be wrapped, a drive unit for the chucking device to turn the pipe body about its longitudinal axis, and a support for accommodating a strip supply roll and a welding device, where the pipe body and the support can move relative to one another in the direction of the longitudinal axis of the pipe body. In a device of this kind, the support is provided with at least one pressure roller that is positioned immediately behind the welding area, contacts the rear side of the web facing away from the contact surface, and presses the web against the pipe body surface after completion of the welding process.

In another variation of the device according to the invention, a coaxial guide roller, which contacts the surface of the leg of the strip facing away from the pressure roller, is provided in addition to the pressure roller, where the leg is guided between the pressure roller and the guide roller. This embodiment is particularly suitable for strips that have been previously bent into an L-shape.

In contrast, if the strip is previously bent into a U-shape, a lateral guide roller can be provided coaxially on each side of the pressure roller to guide the two U-legs together with the pressure roller.

In the embodiment involving a U-shaped strip, the pressure roller and the guide rollers are preferably of the same width, so that they can define the gill spacing.

The guide roller or rollers preferably have a smaller diameter than the pressure roller. This ensures that the guide rollers do not come into contact with the welding device and the weld material and thus are not damaged. The service life of the guide rollers can be considerably prolonged as a result.

The gilled pipe according to the invention, which comprises the cylindrical pipe body and the strip wound onto it in a helical line, preferably has a strip with a web running parallel to the pipe body surface, where the contact surface of the web is welded to the pipe body surface. In this context, the weld, which consists of an additional material, is preferably narrower than the width of the web.

The web can have a bulge pointing away from its contact surface.

The strip can be bent in L-shape, where the leg provided on the web forms the gills.

The strip is preferably bent in U-shape, where the legs provided on the web are the same distance apart as the gills.

The distance between two U-legs of adjacent strip winds preferably corresponds to the distance between the legs of the strip, meaning that the gill spacing of the finished gilled pipe is constant.

Figure 2:
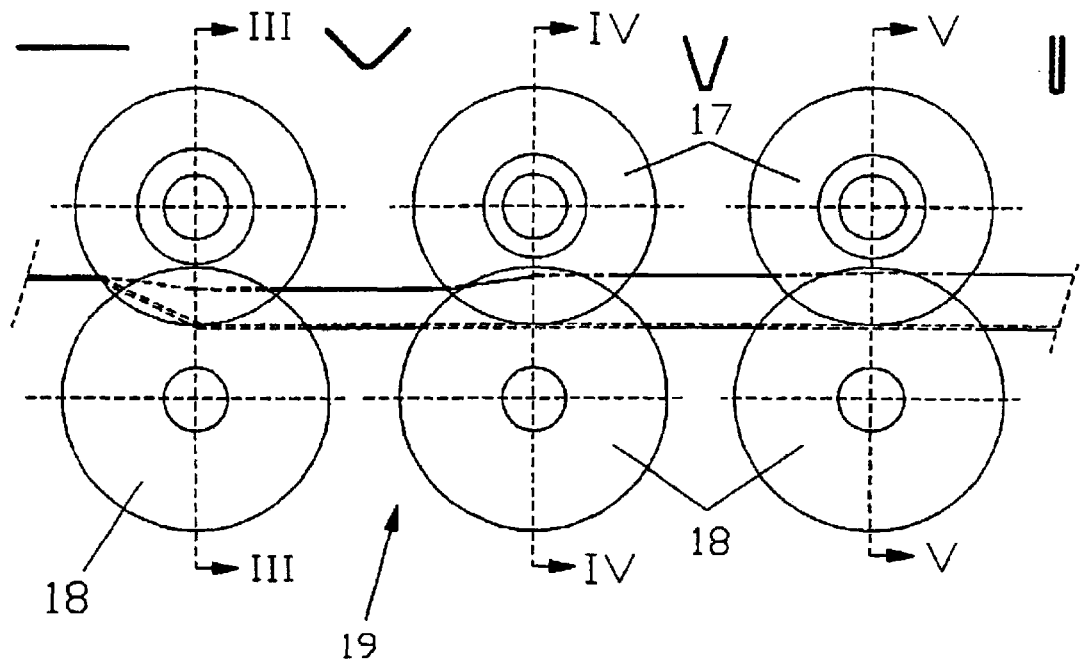
Figure 3:
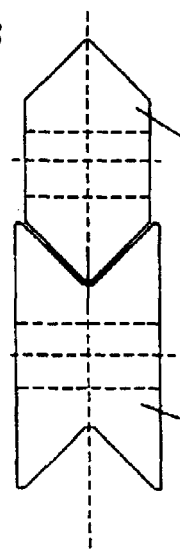
Figure 4:
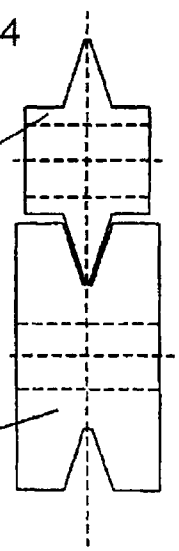
Figure 5:
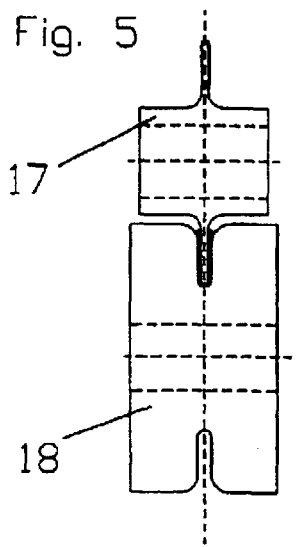
Figure 11:
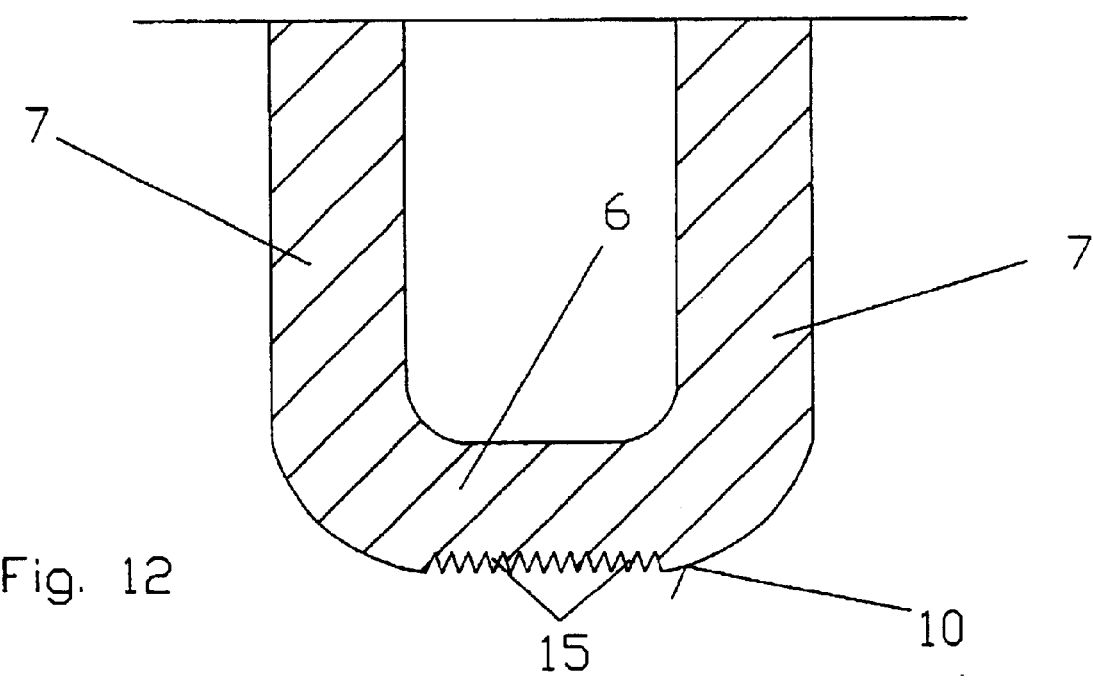
Figure 12:
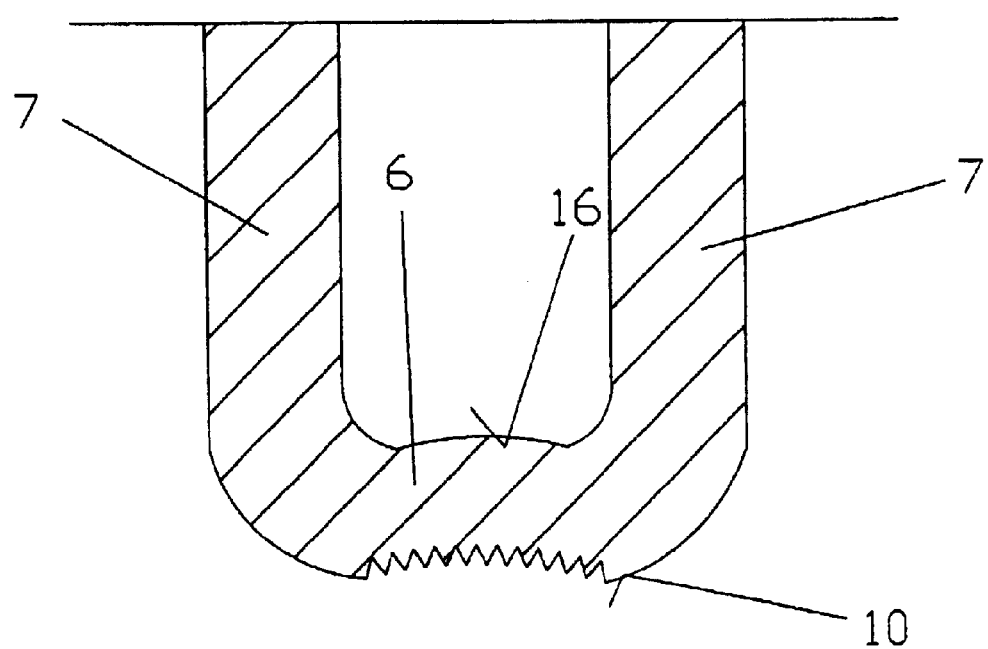

An example of the invention is illustrated in the drawing and explained in detail below on the basis of the drawing. The figures show the following:

FIG. 1 A schematic diagram of a perspective view of the manufacturing device,

FIG. 2 An enlarged view of Section II of the device with a roller unit,

FIG. 3 A section along Line III—III in FIG. 2,

FIG. 4 A section along Line IV—IV in FIG. 2,

FIG. 5 A section along Line V—V in FIG. 2,

FIG. 6 An enlarged view of a section through the gilled pipe according to FIG. 1 in the region of the welding device, FIG. 7 A section along Line VII—VII in FIG. 6, FIG. 8 A section along Line VIII—VIII in FIG. 6, FIG. 9 A section along Line IX—IX in FIG. 6, FIG. 10 A section of the gilled pipe with several welded gills, FIG. 11 An enlarged view of a section through another embodiment of the U-shaped gill design, and FIG. 12 Another variation of the gill design.

According to FIG. 1, gilled pipe 1, which is particularly intended to be a heat exchanger pipe, comprises pipe body 2, whose surface 3 is wrapped for the purpose of enlarging the heat-exchange surface area with a gill-forming strip 4, which is drawn from a supply roll not shown in the figure and joined to pipe surface 3 by weld 5, as shown particularly clearly in FIGS. 6 to 9.

As shown particularly clearly in FIGS. 1 and 10, gill-forming strip 4, which is joined to pipe body 2 by weld 5, is of U-shaped design, where U-web 6 is joined to pipe body 2 by weld 5, while the two U-legs 7 form the gills.

As can be seen in FIGS. 1 to 5, gill-forming strip 4 is unwound from a supply roll not shown in the figure, and then bent into a U-shape in area II shown in FIG. 1, immediately prior to being welded to pipe body 2.

In the embodiment of the device shown in FIG. 2, bending takes place in three stages, where a flat V is formed in the first stage (FIG. 3), a steep V in the second stage (FIG. 4) and, finally, a completed U in the third stage (FIG. 5), which then runs tangentially onto pipe body 2, as shown in FIG. 1. Naturally, a different number of bending stages can also be provided.

As shown particularly clearly in FIG. 6, gill-forming strip 4, or its U-web 6, is welded onto pipe surface 3 by welding device 8 immediately prior to application to pipe body 2. Welding is achieved by means of an additional material, which is fed automatically in the form of continuous welding wire 9. The welding point lies in the region of the open wedge between pipe surface 3 and contact surface 10 of U-web 6 facing the pipe surface.

As shown in FIG. 1, the manufacturing device further includes chucking device 11, in which pipe body 2 is clamped, and a drive unit (not shown) for chucking device 11 to turn pipe body 2 about its longitudinal axis. In addition, a support (not shown) is provided that bears welding device 8 described above, the strip supply roll from which gill-forming strip 4 can be unwound, roller unit 12, and roller system 19 with top rollers 17 and bottom rollers 18 shown in FIGS. 2 to 5. The support and pipe body 2 can move relative to one another in the direction of the longitudinal axis of pipe body 2, where both pipe body 2 and the support can be mobile.

As shown particularly clearly in FIG. 1, roller unit 12 comprises three concentric rollers: a central pressure roller 13 and two lateral guide rollers 14. According to FIG. 10, central pressure roller 13 has the largest diameter, engaging between U-legs 7 during the production process and pressing U-web 6 firmly against the weld. The two lateral guide rollers 14 have a somewhat smaller diameter and are therefore a certain distance away from welding point 5, meaning that they are not attacked by the welding heat or welding material.

The space between pressure roller 13 and the respective guide roller 14 roughly corresponds to the material thickness of gill-forming strip 4, meaning that the U-legs, which are exposed to a considerable degree of deformation during winding onto pipe body 2, are reliably guided.

Roller unit 12 with pressure roller 13 and guide rollers 14 is a very important instrument for ensuring perfect application of gill-forming strip 4 on pipe body 2.

As shown particularly clearly in FIGS. 6 to 9, a relatively narrow weld 5 is initially formed in the wedge between contact surface 10 of U-web 6 and pipe surface 3, which is then expanded with the help of central pressure roller 13 as the winding of gill-forming strip 4 progresses, as shown in FIGS. 7 to 9. In this context, the volume of weld 5 is selected such that a weld is formed in the final phase, as shown in FIG. 9, which displays a roughly constant and relatively small thickness over its entire width. The welding point or weld 5 is narrower than the width of U-web 6, meaning that the weld does not protrude beyond the side of U-web 6. Consequently, a clean weld is produced and relatively little additional welding material is required.

Additional measures can be taken to improve the welded joint, for example by giving contact surface 10 of U-web 6 a special shape.

As shown in FIG. 11, for example, contact surface 10 of U-web 6 is profiled, where the profile has the shape of longitudinal ribs 15.

Longitudinal ribs 15 are rolled in by rollers 17 and 18 in roller system 19 during the manufacturing process.

As shown in FIG. 12, U-web 6 can be provided with bulge 16, which extends upwards away from contact surface 10. Due to bulge 16, a hollow space is formed in the region of contact surface 10 that laterally limits and guides the weld, and prevents the weld from "spilling" to the outside.

As shown in FIG. 6, the weld in the illustrated embodiment is made very far back in the open space between contact surface 10 of U-web 6 and pipe surface 3, meaning that both the surface of pipe body 2 and contact surface 10 of the web are fused, thus producing a very tight welded joint.

Due to the enlarged surface area between pipe surface 3 and U-web 6, a relatively thick welding wire 9 can be used, which can be up to 1.6 mm thick, or possibly even thicker. A welding wire of this kind permits relatively high welding currents in the region of 300 amperes to 800 amperes.

Because only one weld with a relatively small cross-section is required, the high welding current makes it possible to achieve a very high welding speed, which is up to 50% higher than with comparable methods.

Due to the U-shaped design of the gill-forming strip, two gills are applied with one weld, this once again doubling the production rate.

The design of the manufacturing device makes it very robust and less susceptible to faults than known devices, because pressure roller 13 is fully protected by the U-profile surrounding it and guide rollers 14, which do not reach as far as the welding point, are also not contaminated by weld spatter, meaning that rollers 13 and 14 need to be replaced relatively rarely and thus only brief down times occur.

The quality of the weld must also be given special mention in this context, as the weld is very evenly distributed over the width of U-web 6 by the function of pressure roller 13.

In this way, the manufactured product, i.e. completed gilled pipe 1, also displays very high quality and good efficiency with regard to heat transfer from the inside of pipe body 2 to the gills.

The method described, the device illustrated and gilled pipe 1 are by no means limited to the embodiment presented. Good results can also be obtained when an L-shaped gill-forming strip is welded to pipe body 2 instead of the U-shaped gill-forming strip, in which case, however, only one guide roller 14 is required in addition to pressure roller 13.

List of Reference Numbers

| | |
|---|---|
| 1. | Gilled pipe |
| 2. | Pipe body |
| 3. | Pipe surface |
| 4. | Gill-forming strip |
| 5. | Weld |
| 6. | U-web |
| 7. | U-leg |
| 8. | Welding device |
| 9. | Welding wire |
| 10. | Contact surface |
| 11. | Chucking device |
| 12. | Roller unit |
| 13. | Pressure roller |
| 14. | Guide rollers |
| 15. | Longitudinal ribs |
| 16. | Bulge |
| 17. | Top rollers |
| 18. | Bottom rollers |
| 19. | Roller system |

What is claimed is:

1. A gilled metal pipe, particularly a heat exchanger pipe, comprising a cylindrical pipe body (2) and a gill-forming strip (4) wound onto it in a helical line, which is connected to the pipe surface by means of a weld (5) produced with an electric welding device and using an additional material, characterised in that the strip (4) is provided with a web (6) running parallel to the pipe body surface, in that the web (6) has a leg bent at roughly right angles on the strip (4) that forms the gills, in that the contact surface (10) of the web (6) is welded to the pipe body surface (3) at a region of an open wedge between the pipe body surface (3) and the contact surface (10) of the web, in that both the surface (3) of the pipe body (2) and the contact surface (10) of the web (6) to be welded to it are fused during the welding process, and in that the weld (5), consisting of additional material, is narrower than the width of the web.

2. The gilled pipe according to claim 1, characterised in that the contact surface (10) of the web (6) is profiled.

3. The gilled pipe according to claim 2, characterised in that longitudinal ribs (15) are provided as the profile.

4. The gilled pipe according to claim 2, characterised in that transverse ribs are provided as the profile.

5. The gilled pipe according to claim 2, characterised in that nubs are provided as the profile.

6. The gilled pipe according to claim 1, characterised in that the web (6) is provided with a bulge (16) pointing away from its contact surface (10).

7. The gilled pipe according to claim 1, characterised in that the strip is bent in L-shape, where the leg provided on the web forms the gills.

8. The gilled pipe according to claim 1, characterised in that the strip (4) is bent in U-shape, and in that the U-legs (7) provided on the U-web (6) are the same distance apart as the gills.

9. The gilled pipe according to claim 8, characterised in that the distance between two U-legs (7) of adjacent strip winds corresponds to the distance between the legs of the strip (4).

* * * * *